United States Patent [19]

Varis et al.

[11] Patent Number: 5,760,681
[45] Date of Patent: Jun. 2, 1998

[54] BURGLAR ALARM ACTIVATED BY THE MOVEMENT OF AN OBJECT TO BE GUARDED

[75] Inventors: Reijo Varis, Helsinki; Marko Pirinen, Espoo, both of Finland

[73] Assignee: Oy Alektro Safeguard Ltd., Helsinki, Finland

[21] Appl. No.: 716,384

[22] PCT Filed: Mar. 21, 1995

[86] PCT No.: PCT/FI95/00149

§ 371 Date: Oct. 3, 1996

§ 102(e) Date: Oct. 3, 1996

[87] PCT Pub. No.: WO95/26016

PCT Pub. Date: Sep. 28, 1995

[30] Foreign Application Priority Data

Mar. 21, 1994 [FI] Finland .................... 941307

[51] Int. Cl.$^6$ .................... B62J 3/00
[52] U.S. Cl. .................... 340/432; 340/427; 340/568; 340/571; 200/61.64
[58] Field of Search .................... 340/432, 568, 340/427, 571, 546, 429, 693; 200/61.67, 61.64

[56] References Cited

U.S. PATENT DOCUMENTS

| | | | |
|---|---|---|---|
| 3,772,645 | 11/1973 | Odenz et al. | 340/571 X |
| 3,828,310 | 8/1974 | Miller | 340/427 X |
| 4,151,506 | 4/1979 | Schoenmetz | 340/427 X |
| 4,274,056 | 6/1981 | Lukes et al. | 328/162 |
| 4,825,335 | 4/1989 | Wilner | 361/283 |
| 4,980,667 | 12/1990 | Ames | 340/427 |
| 5,270,681 | 12/1993 | Jack | 340/568 X |
| 5,408,212 | 4/1995 | Meyers et al. | 340/427 |
| 5,534,847 | 7/1996 | McGregor | 340/432 |

*Primary Examiner*—Jeffery Hofsass
*Assistant Examiner*—Anh La
*Attorney, Agent, or Firm*—Gifford, Krass, Groh, Sprinkle, Patmore, Anderson & Citkowski, P.C.

[57] ABSTRACT

The present invention is a burglar alarm activated by the movement of an article to be secured. The burglar alarm comprises a housing, a movement-detecting transducer, electronics for processing a signal from the transducer, a battery and an alarm buzzer or radio transmitter. Elements for activating and deactivating the burglar alarm are also included. In the preferred embodiment, the detecting transducer comprises an acceleration transducer in the preferred embodiment. In particular, the present invention is characterized in that the alarm housing includes a hole for coupling the alarm to a bolt- or rod-shaped element which is included in an article to be secured. The activating and deactivating elements are associated with the hole so as to automatically activate the alarm to action readiness and forcibly maintain the alarm in action readiness when the bolt- or rod-shaped element of the article to be secured is in the hole. The removal of the bolt- or rod-shaped element deactivates the alarm from an action readiness state.

9 Claims, 3 Drawing Sheets

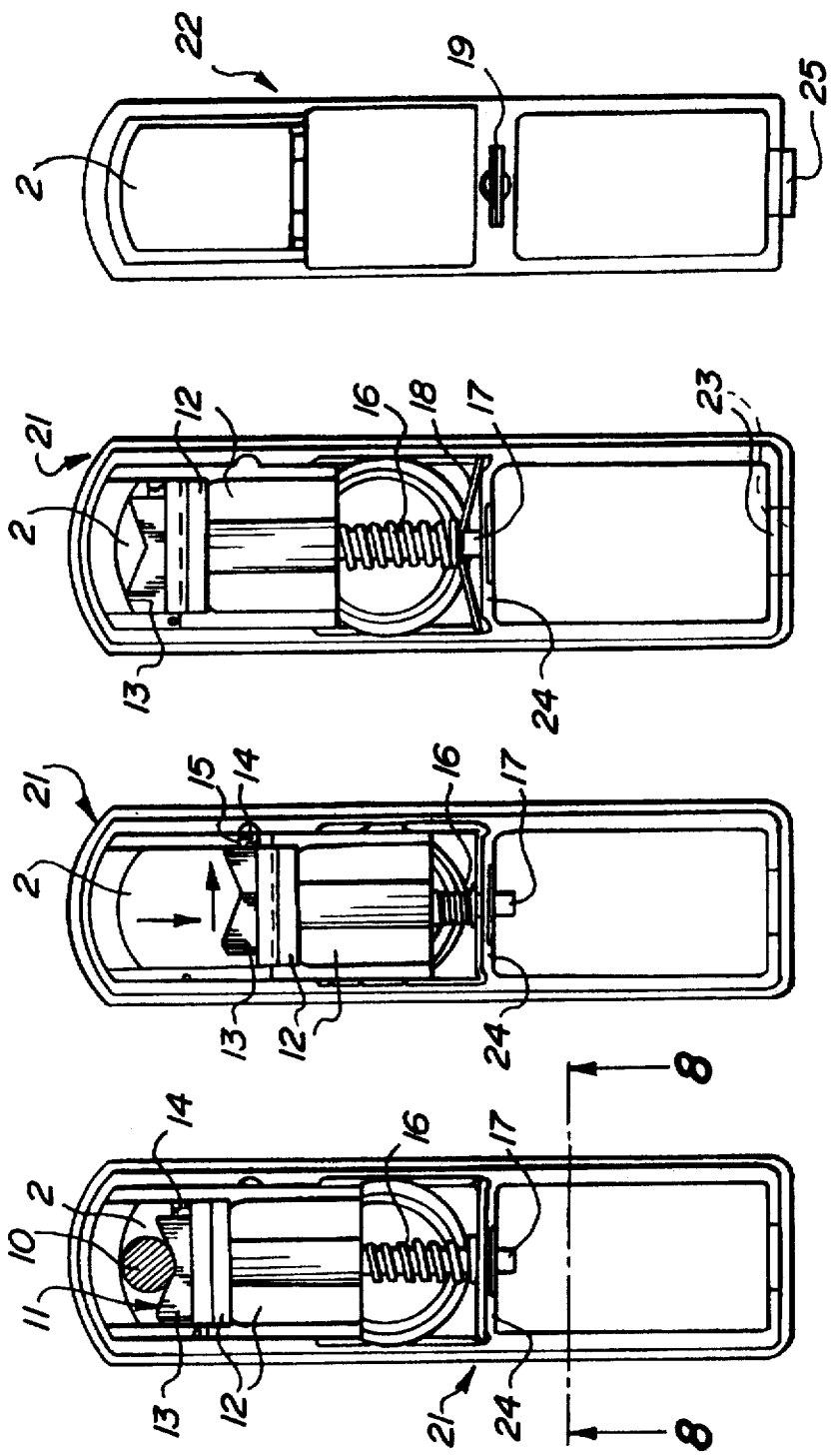

BURGLAR ALARM ACTIVATED BY THE MOVEMENT OF AN OBJECT TO BE GUARDED

The present invention relates to a burglar alarm as set forth in the preamble of claim 1 and activated by a movement.

The operating principles of currently available burglar alarms vary widely according to an intended application. Devices for securing a building, an office, a home and other such immobile objects have often employed alarms based on an interference occurring in an electromagnetic radiation field (infrared, visible light) or a microwave field. Applications intended for providing a desired security against the unauthorized opening of covers, doors, gates or the like have employed magnets, intercepted light beams etc.

However, the above principles are not very well adaptable (because of a high price, complicated installation or operation) to burglar alarms which are needed when the intention is to secure articles whose stealing always requires that the article be moved, the purpose being to prevent the movement of an article. Such articles include e.g. a car, a boat, a motorcycle, a bicycle, a work or piece of art, an exhibit, a beach bag etc.

A problem in the alarms for this type of applications is that the prevention of false alarms and the foolproof alarming in a real-life situation are difficult to combine and accomplish as the alarming is usually effected on the "ON-OFF" principle. The prevention of thefts of cars, boats, bicycles and motorcycles or other such utility articles often produce situations that some legitimate interference may cause the movement or shift of a secured article. The authorized user of a bike, a boat etc. adjacent to a secured bike, boat etc. may accidentally stir the secured bike, boat etc. or is even forced to move it to use his or her own.

With prior art burglar alarms, this is likely to produce false alarms. In view of overcoming this problem, U.S. Pat. No. 4,845,464 proposes a vehicle burglar alarm whose activating sensitivity is programmable by the user. This prior known alarm is useful as an automobile burglar alarm but not for more general use as a burglar alarm e.g. for bicycles, briefcases or the like small articles. In the latter cases, the requirement is that an alarm, which is accessible, cannot be removed or deactivated e.g. without a key to the lock of a bicycle or the like.

Another problem with the prior known burglar alarms is the activation and re-deactivation of an alarm in a user-convenient and constructively inexpensive and reliable fashion.

An object of the invention is to eliminate the shortcomings and to provide a burglar alarm activated by the movement of an article to be secured, wherein the operation and construction are combined in a manner that the alarm has a versatile range of application in addition to operating reliability.

A further object of the invention is to provide a burglar alarm whose activation and deactivation can be effected conveniently, even automatically, yet in such a manner that the device cannot be deactivated by an unauthorized user without breaking the device or its mountings.

The above objects of the invention are accomplished on the basis of characterizing features set forth in the annexed claims.

The invention will now be described in more detail by way of exemplary embodiments with reference made to the accompanying drawings, in which FIG. 1 is a side view of an alarm of the invention and components included therein and FIG. 2 shows the same in a plan view.

FIGS. 4–6 illustrate an alarm according to a second embodiment of the invention in a cut-away view and without electrical components.

FIG. 7 shows a cover for the alarm of FIGS. 4–6, and

FIG. 8 is a cross-sectional view of the alarm of FIGS. 4–7 along a section line VIII—VIII in FIG. 4 with a cover 22 locked in position.

Figure 1:
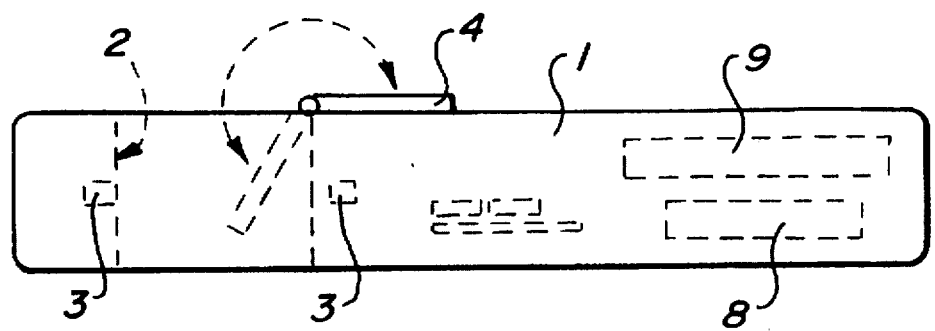
Figure 2:
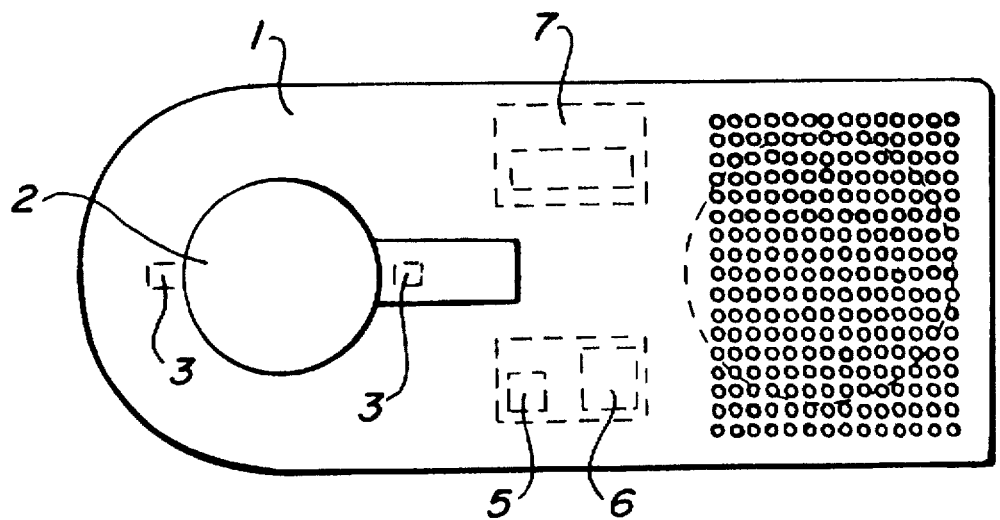
Figure 3:
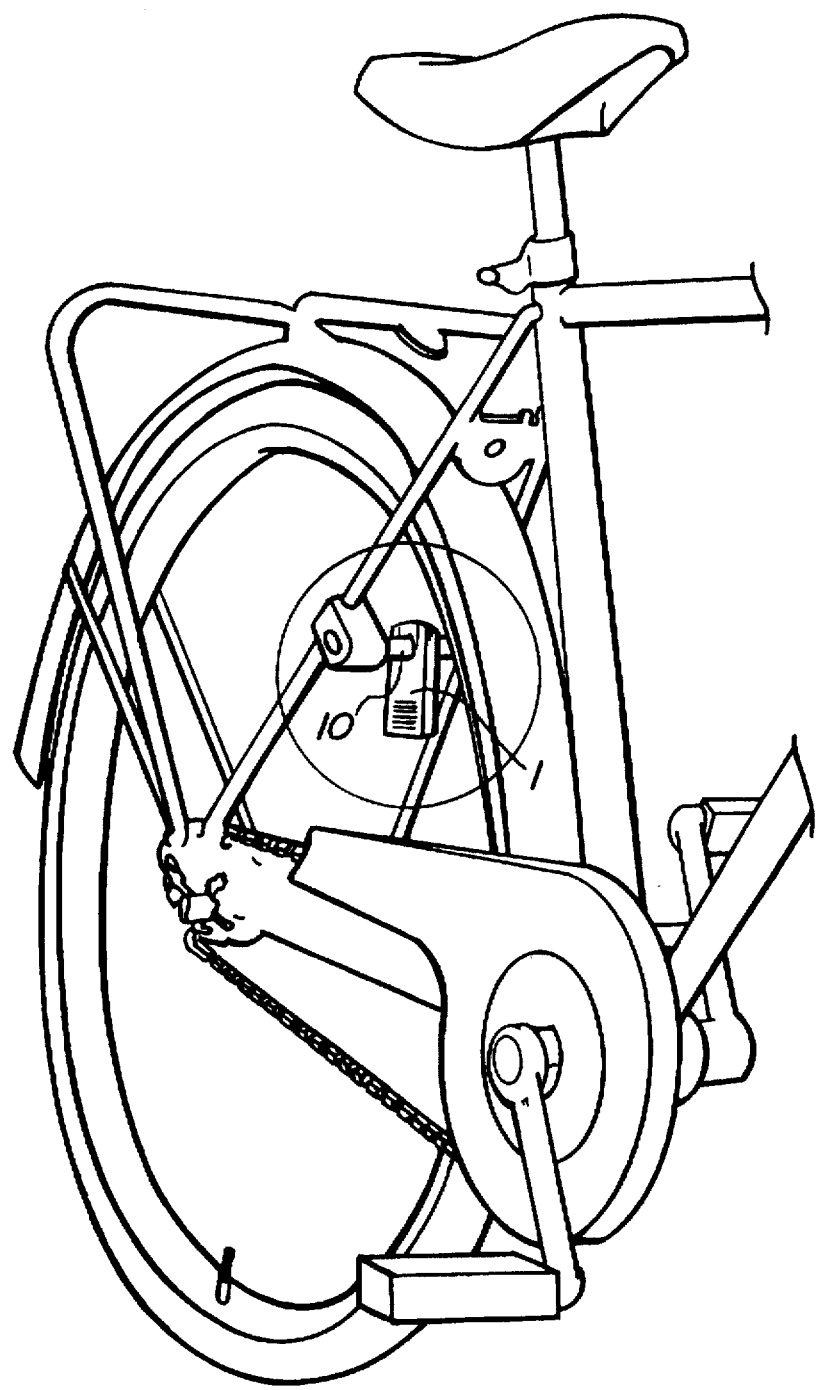
FIG. 3 depicts an alarm of the invention in an operative situation according to one application thereof.

An alarm housing 1 is made e.g. of a strong, tough plastic plastics material but it can also be made of a metal, such as aluminium or steel. The housing 1 includes a hole 2 for coupling the alarm to a bolt- or rod-shaped element included in an article to be secured or guarded. In the illustrated case, the hole 2 is surrounded by the intact material of the housing 1. This requires that the bolt- or rod-shaped element of an article to be secured include a free end prior to locking it with a key in such a manner that the alarm cannot be removed from the bolt- or rod-shaped element. In the case of a burglar alarm for a bicycle, for example, such bolt- or rod-shaped element comprises a locking bolt 10, which is insertable or pivotable in between the spokes of a bicycle and a standard piece of equipment in most current bicycles (FIG. 3). A similar key-locked security device (which in itself is not an object of this invention) can be readily developed for a variety of articles to be secured. A collar surrounding the hole 2 may also serve the same purpose as the shackle of a padlock, the lock core along with its keyway being included in the housing 1.

Adjacent to the hole 2 is a magnetic clutch 3 which activates the alarm to action readiness upon detecting a ferromagnetic matter in the hole 2. If the alarm is used in articles in which an element to be inserted in the hole 2 is not ferromagnetic, the activating element comprises an activating tongue 4 which is hinged to be pivoted alongside and which remains in an activating position pivoted inside the hole when the bolt- or rod-shaped element included in an article to be secured is located in the hole 2.

In the case of the magnetic clutch 3, activation and deactivation is effected in a totally automatic fashion while, when using the activating tongue 4, the user must be mindful of turning the tongue into the hole 2 prior to attaching the alarm to an article to be secured. The activating tongue 4 can be made of a ferromagnetic material and, thus, when pivoted in the hole, it shall activate the magnetic clutch 3. Thus, the activating tongue 4 need not be in a direct operative connection with the device-controlling electronics.

Inside the housing 1 is a capacitive acceleration transducer 5, an ASIC circuit associated therewith producing a continuous analogous electrical signal which represents the acceleration detected by the transducer 5. This signal is delivered to circuit elements 7 for electronic analysis of the signal. The circuit elements 7 are designed e.g. as a hybrid circuit, including sufficient electronics (a microprocessor, if necessary) for analyzing the form of movement on the basis of a movement signal. Thus, the alarm can be initiated when the form of movement satisfies the predetermined criteria. Such criteria must be determined individually for each article to be secured considering which type of movements each article may be subjected to accidentally and legitimately and how the form of movement differs from the above in the case of a theft. For example, portable small articles have a certain form of movement based on the pacing rhythm. A relatively reliable analysis can be obtained if determination of the form of movement is carried out by considering at least two of the four following parameters:

the acceleration of movement, the minimum number of movement repetitions, the repetition frequency and amplitude of movement. The latter can be determined on the basis of the duration and strength of an acceleration signal.

The duration and intensity of the manipulation of an article (thus, a sort of form of movement) can also be monitored by converting the analogous signal of an acceleration transducer into a digital format and by storing bytes in a buffer which is unloaded continuously or at a given rate. The buffer is set with an upper limit for the number of bytes, whereby overstepping of the limit produces an alarm. Thus, for example, a single sudden movement, even a violent one (e.g. when a bicycle topples over), does not produce an alarm. Neither does a slight vibration, which can be caused e.g. by vibration of the ground and is thus lesser than that caused by the movement of an article, produce an alarm. During the course of manufacture, the buffer unloading rate and/or said alarm limit can be designed adjustable to various readings or to be set in such a manner that a single device is adaptable to a variety of applications depending on individual presetting.

The detection of a form of movement that satisfies the predetermined criteria initiates an alarm, which can be e.g. a sound alarm produced by a buzzer 9. Since the device cannot be removed from an article without effective tools, carrying an alarm-sounding article along will be embarrassing. The power of a battery 8 must be dimensioned in view of a sufficient alarm period. Instead of or in addition to the buzzer 9 it is naturally possible to use an alarm produced over a radio.

The transducer 5 comprises an acceleration transducer for the reason that the signal of an acceleration transducer provides sufficiently diversified information for the above analysis. The appropriate acceleration transducers 5 along with their ASIC-circuits 6 are manufactured in Finland by Vaisala Technologies, Inc. (e.g. for automobile active suspensions). Since the question is about a commercial product, its construction is not described in this context.

The following describes a further developed embodiment of the invention, which is depicted in FIGS. 4–8.

The housing comprises a case element 21 and a cover element 22, which is non-threadably lockable on top of the case element 21 as described hereinbelow. A slide 12, 13 is adapted to be manipulated in the hole 2 against the force of a spring 16. The spring 16 forces the slide 12, 13 to a deactivating position. When the slide 12, 13 is depressed against the force of said spring 16 over a short distance, the slide arrives in an activating position, wherein the slide exerts a mechanical action on an electrical activating element, not shown. A rod or a bolt 10 inserted in the hole 2 retains the slide 12, 13 in the activating position. At the same time, said spring 16 presses the slide 12, 13 against the rod or bolt 10, whereby the alarm does not dangle e.g. as a result of wind action. The rod or bolt 10 can have a thickness which ranges from the minimum thickness shown in FIG. 4 to the size of the opening 2 shown in FIG. 5. In the case of FIG. 5, the slide 12, 13 is locked in the activating position and, thus, the hole 2 is empty. To this end, the latch 13 included in the slide is shifted horizontally such that a cog 14 included in the latch 13 engages behind an edge 15 of a recess included in the case 21. This locking can be effected simply by pushing with a finger inserted in the hole 2. An alarm locked this way can be used in an activated state e.g. in a briefcase, a car or a like enclosed space.

In addition to tightening an alarm in position and serving as an ON-OFF switch, the slide 12, 13 has even a third function. The slide element 12 is provided with a bolt 17, which is surrounded by the spring 16 and which extends through a partition 24 into the engagement with a lug 19 included in the cover 22. With the cover 22 placed in position, the lug 19 settles alongside the partition 24, the end of said bolt 17 extending through a hole 20 included in the lug 19. Thus, the cover 22 cannot be removed from its position. When the slide 13, 12 is forced upwards against the force of a spring 18 to the position shown in FIG. 6, the end of said bolt 17 is extracted from the hole 20 of said lug 19 and, thus, the cover 22 can be disengaged. When the bolt or rod 10 inserted in the hole 2 prevents lifting of the slide 12, 13 as shown in FIG. 6, the housing case cannot be opened. Since the case is made of a strong material, the alarm cannot be stopped except by extracting the bolt or rod 10 out of the hole 2. In the case of a bicycle lock, for example, this is not possible except by means of a key to this lock. Breaking the lock, e.g. by sawing the bolt 10, is not likely to happen with a loud alarm on. A lug 25 included in the end of the cover 2 engages in a hole or a recess 23 included in the end of said case 21.

We claim:

1. A burglar alarm activated by the movement of an article to be secured, comprising an alarm housing (1; 21, 22), a movement-detecting transducer (5), electronics (6, 7) for processing a signal from the transducer (5), a battery (8) and an alarm buzzer (9) or a radio transmitter, and elements (3 and/or 4; 12, 13) for activating and deactivating the burglar alarm, said detecting transducer (5) comprising an acceleration transducer and said electronics including circuit elements (7) for analyzing the form of movement, the alarm being initiated as the detected form of movement satisfies predetermined criteria, characterized in that the alarm housing (1) includes a hole (2) for coupling the alarm to a bolt- or rod-shaped element (10) included in an article to be secured and that said activating and deactivating elements (3; 4; 12, 13) are associated with the hole (2) so as to automatically activate the alarm to action readiness and to forcedly maintain the alarm in action readiness when the bolt- or rod-shaped element (10) of an article to be secured is located in said hole (2), the removal of the bolt- or rod-shaped element (10) deactivating the alarm.

2. A burglar alarm as set forth in claim 1, characterized in that the hole (2) is surrounded by material of said housing (1).

3. A burglar alarm as set forth in claim 1, characterized in that the acceleration transducer (5) comprises a capacitive acceleration transducer.

4. A burglar alarm activated by the movement of an article to be secured, comprising an alarm housing (1; 21, 22) a movement-detecting transducer (5), electronics (6, 7) for processing a signal from the transducer (5), a battery (8) and an alarm buzzer (9) or radio transmitter, and elements (3 and/or 4; 12, 13) for activating and deactivating the burglar alarm, said detecting transducer (5) comprising an acceleration transducer and said electronics including circuit elements (7) for analyzing the form of movement, the alarm being initiated as the detected form of movement satisfies the predetermined criteria, characterized in that the alarm housing (1) includes means (2) for coupling the alarm to a bolt- or rod-shaped element (10) included in an article to be secured and that said activating and deactivating elements (3; 4; 12, 13) are associated with the means (2) so as to automatically activate the alarm to action readiness and to forcedly maintain the alarm in action readiness when the bolt- or rod-shaped element (10) of an article to be secured is located in said means (2), characterized in that said activating and deactivating elements include a slide (12, 13), which is moveable in the means (2) and limits the size of said means (2) and is forced by a spring (16) to an activating position, whereby the size of said means (2) restricted by the slide (12, 13) increases as said slide (12, 13) is depressed from the deactivating position to the activating position.

5. A burglar alarm as set forth in claim 4, characterized in that the slide (12, 13) is provided with a latch (13, 14) for locking said slide to the activating position.

6. A burglar alarm as set forth in claim 4, characterized in that the housing further includes two halves (21, 22) are locked to each other by means of a locking element (17) for preventing the opening of said housing (21, 22) in the activating position of said slide (12, 13).

7. A burglar alarm activated by the movement of an article to be secured, comprising an alarm housing (1; 21, 22) a movement-detecting transducer (5), electronics (6, 7) for processing a signal from the transducer (5), a battery (8) and an alarm buzzer (9) or radio transmitter, and elements (3 and/or 4; 12, 13) for activating and deactivating the burglar alarm, said detecting transducer (5) comprising an acceleration transducer and said electronics including circuit elements (7) for analyzing the form of movement, the alarm being initiated as the detected form of movement satisfies the predetermined criteria, characterized in that the alarm housing (1) includes means (2) for coupling the alarm to a bolt- or rod-shaped element (10) included in an article to be secured and that said activating and deactivating elements (3; 4; 12, 13) are associated with the means (2) so as to automatically activate the alarm to action readiness and to forcedly maintain the alarm in action readiness when the bolt- or rod-shaped element (10) of an article to be secured is located in said means (2), characterized in that alongside the means (2) is a magnetic clutch (3) which activates the alarm to action readiness upon detecting a ferromagnetic material in the means (2).

8. A burglar alarm activated by the movement of an article to be secured, comprising an alarm housing (1; 21, 22), a movement-detecting transducer (5), electronics (6, 7) for processing a signal from the transducer (5), a battery (8) and an alarm buzzer (9) or radio transmitter, and elements (3 and/or 4; 12, 13) for activating and deactivating the burglar alarm, said detecting transducer (5) comprising an acceleration transducer and said electronics including circuit elements (7) for analyzing the form of movement, the alarm being initiated as the detected form of movement satisfies the predetermined criteria, characterized in that the alarm housing (1) includes a hole (2) for coupling the alarm to a bolt- or rod-shaped element (10) included in an article to be secured and that said activating and deactivating elements (3; 4; 12, 13) are associated with the hole (2) so as to automatically activate the alarm to action readiness and to forcedly maintain the alarm in action readiness when the bolt- or rod-shaped element (10) of an article to be secured is located in said hole (2), characterized in that alongside the hole (2) is an activating tongue (4) which is switchable from alongside into the hole and which remains in an activating position switched inside the hole when the bolt- or rod-shaped element is included in an article to be secured is located in the hole (2).

9. A burglar alarm activated by the movement of an article to be secured, comprising an alarm housing (1; 21, 22), a movement-detecting transducer (5), electronics (6, 7) for processing a signal from the transducer (5), a battery (8) and an alarm buzzer (9) or radio transmitter, and elements (3 and/or 4; 12, 13) for activating and deactivating the burglar alarm, said detecting transducer (5) comprising an acceleration transducer and said electronics including circuit elements (7) for analyzing the form of movement, the alarm being initiated as the detected form of movement satisfies the predetermined criteria, characterized in that the alarm housing (1) includes a hole (2) for coupling the alarm to a bolt- or rod-shaped element (10) included in an article to be secured and that said activating and deactivating elements (3; 4; 12, 13) are associated with the hole (2) so as to automatically activate the alarm to action readiness and to forcedly maintain the alarm in action readiness when the bolt- or rod-shaped element (10) of an article to be secured is located in said hole (2), characterized in that the alarm comprises a bicycle burglar alarm, which can be coupled to a bicycle by inserting a locking bolt (10) pushable or pivotable in between the spokes of a bicycle wheel in said hole (2) prior to pushing or pivoting the locking bolt in between the spokes of the bicycle wheel.

* * * * *